US012672675B2

(12) United States Patent
Bae et al.

(10) Patent No.: US 12,672,675 B2
(45) Date of Patent: Jul. 7, 2026

(54) METHOD OF GENERATING AEROSOL AND ELECTRONIC DEVICE FOR PERFORMING THE SAME

(71) Applicant: KT&G CORPORATION, Daejeon (KR)

(72) Inventors: Hyung Jin Bae, Daejeon (KR); Wonyoung Ko, Daejeon (KR); Giho Son, Daejeon (KR)

(73) Assignee: KT&G CORPORATION, Daejeon (KR)

(*) Notice: Subject to any disclaimer, the term of this patent is extended or adjusted under 35 U.S.C. 154(b) by 462 days.

(21) Appl. No.: 18/031,938

(22) PCT Filed: Nov. 29, 2022

(86) PCT No.: PCT/KR2022/019102
§ 371 (c)(1),
(2) Date: Apr. 14, 2023

(87) PCT Pub. No.: WO2023/167393
PCT Pub. Date: Sep. 7, 2023

(65) Prior Publication Data
US 2024/0373930 A1 Nov. 14, 2024

(30) Foreign Application Priority Data
Mar. 3, 2022 (KR) ........................ 10-2022-0027445

(51) Int. Cl.
*A24F 40/465* (2020.01)
*H02M 7/493* (2007.01)

(52) U.S. Cl.
CPC ........... *A24F 40/465* (2020.01); *H02M 7/493* (2013.01)

(58) Field of Classification Search
CPC .................................................. H02M 7/493
See application file for complete search history.

(56) References Cited

U.S. PATENT DOCUMENTS

| | | | |
|---|---|---|---|
| 10,945,456 B2 * | 3/2021 | Mironov ................. A24F 40/46 |
| 2016/0021934 A1 | 1/2016 | Cadieux et al. |
| 2016/0120225 A1 | 5/2016 | Mishra et al. |

FOREIGN PATENT DOCUMENTS

| | | | | |
|---|---|---|---|---|
| JP | 2019-37226 A | 3/2019 | |
| KR | 10-0485677 B1 | 4/2005 | |
| KR | 10-2011-0131534 A | 12/2011 | |
| KR | 101134419 B1 * | 4/2012 | .......... H02M 7/4826 |
| KR | 10-2021-0053016 A | 5/2021 | |
| KR | 10-2326189 B1 | 11/2021 | |
| WO | 91/15935 A1 | 10/1991 | |

(Continued)

OTHER PUBLICATIONS

KR101134419 Translation (Year: 2012).*

(Continued)

*Primary Examiner* — Crystal L Hammond
*Assistant Examiner* — Jennifer C Caulk
(74) *Attorney, Agent, or Firm* — Sughrue Mion, PLLC

(57) ABSTRACT

According to one embodiment, in order to heat an aerosol-generating substrate, eddy currents can generated in a susceptor of the aerosol-generating substrate by generating synthesized alternating currents having different frequencies and supplying the synthesized alternating currents to a coil surrounding the aerosol-generating substrate.

10 Claims, 4 Drawing Sheets

(56)     References Cited

FOREIGN PATENT DOCUMENTS

| WO | WO-2020120551 A1 * | 6/2020 | ............... A24D 1/20 |
| WO | WO-2021029611 A1 * | 2/2021 | ........... A24F 40/465 |
| WO | WO-2021074254 A1 * | 4/2021 | ............. A24F 40/20 |
| WO | 2021/176221 A1 | 9/2021 | |
| WO | 2022/025550 A1 | 2/2022 | |

OTHER PUBLICATIONS

International Search Report for PCT/KR2022/019102 dated Feb. 24, 2023.
Japanese Office Action issued Apr. 30, 2024 in Application No. 2023-517244.
Extended European Search Report issued May 28, 2024 in Application No. 22905486.1.
Office Action issued Aug. 6, 2024 in Korean Application No. 10-2022-0027445.
W. S. Shin, et al., "Design of Simultaneous Dual Frequency Output by Dual Inverter", Power Electronics Society, 2010, pp. 498-499 (3 pages total).
Chinese Office Action dated Apr. 3, 2026, issued in Chinese application No. 202280008236.2.

* cited by examiner

METHOD OF GENERATING AEROSOL AND ELECTRONIC DEVICE FOR PERFORMING THE SAME

CROSS REFERENCE TO RELATED APPLICATIONS

This application is a National Stage of International Application No. PCT/KR2022/019102 filed Nov. 29, 2022, claiming priority based on Korean Patent Application No. 10-2022-0027445 filed Mar. 3, 2022.

TECHNICAL FIELD

The following embodiments relate to a technology for generating an aerosol, and more particularly, to a technology for generating heat based on a current.

BACKGROUND ART

Recently, demands for alternative ways to overcome disadvantages of general cigarettes have increased. For example, the demand for a method of generating an aerosol by heating an aerosol generating substrate included in a cigarette rather than by burning the cigarette is increasing. Accordingly, research on a heating-type cigarette or a heating-type aerosol generating device is being actively conducted.

DISCLOSURE OF THE INVENTION

Technical Goals

An embodiment may provide a method of generating an aerosol that may be performed by an electronic device.

An embodiment may provide an electronic device for generating an aerosol.

Technical Solutions

According to an embodiment, an electronic device may include a controller configured to control an operation of the electronic device, an inverter unit configured to supply a current to a heater, and the heater configured to heat at least a portion of an aerosol generating substrate inserted into the electronic device using the current. The current may have a simultaneous dual-frequency (SDF).

The inverter unit may include a rectifier configured to adjust an output of a direct current (DC) to be supplied to the inverter unit, a first inverter configured to generate a first alternating current (AC) having a first frequency based on the DC, a second inverter configured to generate a second AC having a second frequency based on the DC, and a filter configured to generate the current by synthesizing the first AC and the second AC.

An eddy current may be generated in the at least a portion of the aerosol generating substrate by the current, and the aerosol generating substrate may be heated by the eddy current.

A first portion of the aerosol generating substrate may be heated by a first component of the current corresponding to the first AC, and a second portion of the aerosol generating substrate may be heated by a second component of the current corresponding to the second AC.

The first AC may have a medium frequency (MF), and the second AC may have a high frequency (HF).

The heater may include a coil formed to be wound around the aerosol generating substrate.

According to another embodiment, a method of controlling an electronic device includes adjusting an output of a DC supplied to an inverter unit of the electronic device, generating a first AC having a first frequency based on the DC, generating a second AC having a second frequency based on the DC, generating a current by synthesizing the first AC and the second AC, and heating at least a portion of an aerosol generating substrate inserted into the electronic device by supplying the current to a heater of the electronic device. The current may have an SDF.

An eddy current may be generated in the at least a portion of the aerosol generating substrate by the current, and the aerosol generating substrate may be heated by the eddy current.

A first portion of the aerosol generating substrate may be heated by a first component of the current corresponding to the first AC, and a second portion of the aerosol generating substrate may be heated by a second component of the current corresponding to the second AC.

The heater may include a coil formed to be wound around the aerosol generating substrate.

Effects

A method of generating an aerosol, performed by an electronic device, may be provided.

An electronic device for generating an aerosol may be provided.

BEST MODE FOR CARRYING OUT THE INVENTION

Figures 1, 2:
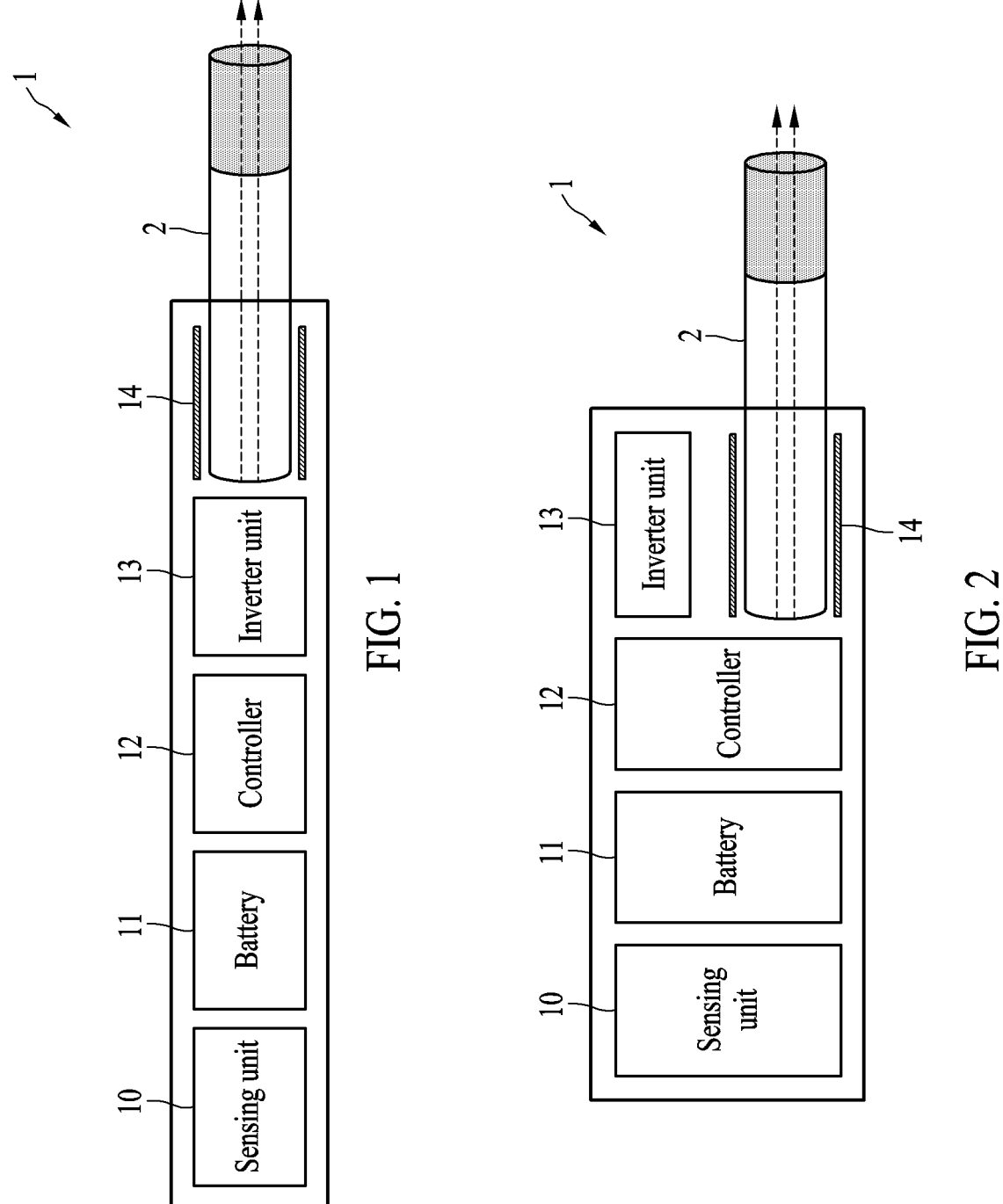
FIGS. 1 and 2 are diagrams illustrating examples of a cigarette inserted into an aerosol generating device according to various embodiments.

The following structural or functional descriptions of example embodiments described herein are merely intended for the purpose of describing the example embodiments described herein and may be implemented in various forms. Here, the example embodiments are not construed as limited to the disclosure and should be understood to include all changes, equivalents, and replacements within the idea and the technical scope of the disclosure.

Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/including" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

Hereinafter, the examples will be described in detail with reference to the accompanying drawings. When describing an embodiment with reference to the accompanying drawings, like reference numerals refer to like elements and a repeated description related thereto will be omitted.

FIGS. 1 and 2 are diagrams illustrating examples of a cigarette inserted into an aerosol generating device according to various embodiments.

A user may smoke as being provided with an aerosol generated by an aerosol generating device 1. The aerosol generating device 1 may be referred to as an electronic cigarette device or a smoking stick. For example, the aerosol generating device 1 may generate an aerosol by heating a cigarette 2 inserted into the aerosol generating device 1.

Referring to FIGS. 1 and 2, the aerosol generating device 1 includes a sensing unit 10, a battery 11, a controller 12, an inverter unit 13, and a heater 14. The cigarette 2 may be inserted into an inner space of the aerosol generating device 1. For example, the heater 14 may include a coil (e.g., an electrically conductive coil) wound around at least a portion of the cigarette 2 inserted into the aerosol generating device 1.

According to an embodiment, an induction heating scheme using a coil may be advantageous in instantaneous temperature-increasing and consume less power. For example, the heater 14 of the aerosol generating device 1 may not include a susceptor and may perform induction heating on wrapping paper (e.g., a metal foil) wrapping an aerosol generating substrate of the cigarette 2.

According to an embodiment, it is to be understood by those of ordinary skill in the art to which the present disclosure pertains that the aerosol generating device 1 may further include other generally used components in addition to the ones shown in FIGS. 1 and 2. For example, the aerosol generating device 1 may further include a display.

FIG. 1 illustrates a linear alignment of the battery 11, the controller 12, the inverter unit 13, and the heater 14. Further, FIG. 2 illustrates a parallel alignment of the inverter unit 13 and the heater 14. However, the internal structure of the aerosol generating device 1 is not limited to what is shown in FIGS. 1 and 2. That is, such alignments of the sensing unit 10, the battery 11, the controller 12, the inverter unit 13, and the heater 14 may be changed depending on the design of the aerosol generating device 1.

When the cigarette 2 is inserted into the aerosol generating device 1, the aerosol generating device 1 may actuate the heater 14 to generate an aerosol. The aerosol generated by the heater 14 may pass through the cigarette 2 into a user.

The battery 11 may supply power to be used to operate the aerosol generating device 1. For example, the battery 11 may supply power required to operate the controller 12. In addition, the battery 11 may supply power required to operate a display, a sensor, a motor, or the like provided in the aerosol generating device 1. The battery 11 may be a rechargeable battery or a disposable battery. The battery 11 may be, for example, a lithium polymer (LiPoly) battery, but is not limited to the above-described embodiment.

The controller 12 may control the overall operation of the aerosol generating device 1. Specifically, the controller 12 may control respective operations of other components included in the aerosol generating device 1, in addition to the sensing unit 10, the battery 11, the inverter unit 13, and the heater 14. In addition, the controller 12 may verify a state of each of the components of the aerosol generating device 1 to determine whether the aerosol generating device 1 is in an operable state.

The controller 12 may include at least one processor. The processor may be implemented as an array of a plurality of logic gates, or may be implemented as a combination of a general-purpose microprocessor and a memory in which a program executable by the microprocessor is stored. In addition, it is to be understood by one of ordinary skill in the art to which the present disclosure pertains that the processor may be implemented in other types of hardware.

The inverter unit 13 may generate a synthesized alternating current (AC) to be supplied to a coil of the heater 14 based on a direct current (DC) supplied from the battery 11. For example, the synthesized AC may have a simultaneous dual-frequency (SDF). The inverter unit 13 will be described in detail below with reference to FIG. 3.

The heater 14 may be heated by the synthesized AC supplied by the inverter unit 13. For example, when the cigarette 2 is inserted into the aerosol generating device 1, the coil of the heater 14 may be wound around at least a portion of an outer portion of the cigarette 2. According to an embodiment, the synthesized alternating current flowing through the coil may generate an eddy current on a surface of the cigarette 2. At least a portion (e.g., the aerosol generating substrate) of the cigarette 2 may be heated by the eddy current, thereby generating an aerosol.

According to an embodiment, the heater 14 may include a coil for heating the cigarette 2 in an induction heating manner, and the cigarette 2 may include a susceptor to be heated by the coil. For example, the susceptor may be in the form of a metal foil wrapping the aerosol generating device.

According to an embodiment, the aerosol generating device 1 may further include a vaporizer (not shown) that may generate an aerosol by heating a liquid composition. The aerosol generated through the vaporizer may pass through the cigarette 2 into a user. That is, the aerosol generated by the vaporizer may travel along an airflow path of the aerosol generating device 1, and the airflow path may be configured such that the aerosol generated by the vaporizer passes through the cigarette 2 into the user.

For example, the vaporizer may include a liquid storage, a liquid transfer means, and a heating element. However, embodiments are not limited thereto. For example, the liquid storage, the liquid transfer means, and the heating element may be included as independent modules in the aerosol generating device 1.

The liquid storage may store a liquid composition. The liquid composition may be, for example, a liquid including a tobacco-containing material that includes a volatile tobacco flavor component, or may be a liquid including a non-tobacco material. The liquid storage may be manufactured to be detachable and attachable from and to the vaporizer, or may be manufactured integrally with the vaporizer.

The liquid composition may include, for example, water, a solvent, ethanol, a plant extract, a fragrance, a flavoring agent, or a vitamin mixture. The fragrance may include, for example, menthol, peppermint, spearmint oil, various fruit flavor ingredients, and the like. However, embodiments are not limited thereto. The flavoring agent may include ingredients that provide the user with a variety of flavors or scents. The vitamin mixture may be a mixture of at least one of vitamin A, vitamin B, vitamin C, or vitamin E. However, the embodiments are not limited thereto. The liquid composition may also include an aerosol former such as glycerin and propylene glycol.

The liquid transfer means may transfer the liquid composition in the liquid storage to the heating element. The liquid transfer means may be, for example, a wick such as cotton fiber, ceramic fiber, glass fiber, or porous ceramic. However, embodiments are not limited thereto.

The heating element may be an element for heating the liquid composition transferred by the liquid transfer means. The heating element may be, for example, a metal heating wire, a metal heating plate, a ceramic heater, or the like. However, embodiments are not limited thereto.). Further, the heating element may include a conductive filament such as a nichrome wire, and may be arranged in a structure wound around the liquid transfer means. The heating element may be heated as a current is supplied and may transfer heat to the liquid composition in contact with the heating element, thereby heating the liquid composition. As a result, an aerosol may be generated.

For example, the vaporizer may also be referred to as a cartomizer or an atomizer. However, embodiments are not limited thereto.

Meanwhile, the aerosol generating device 1 may further include general-purpose components in addition to the sensing unit 10, the battery 11, the controller 12, the inverter unit 13, and the heater 14. For example, the aerosol generating device 1 may include a display that outputs visual information and/or a motor that outputs tactile information.

According to an embodiment, the sensing unit 10 may further include a puff detection sensor, a temperature detection sensor, and a cigarette insertion detection sensor. In addition, the aerosol generating device 1 may be manufactured to have a structure in which external air may be introduced or internal gas may flow out even with the cigarette 2 being inserted.

Although not shown in FIGS. 1 and 2, the aerosol generating device 1 may constitute a system along with a separate cradle. For example, the cradle may be used to charge the battery 11 of the aerosol generating device 1. Alternatively, the cradle may be used to heat the heater 14, with the cradle and the aerosol generating device 1 coupled.

The cigarette 2 may be of a similar type to a general burning type. For example, the cigarette 2 may be divided into a first portion including an aerosol generating material and a second portion including a filter or the like. Alternatively, the second portion of the cigarette 2 may also include the aerosol generating material. For example, an aerosol generating material provided in the form of granules or capsules may be inserted into the second portion.

The first portion may be entirely inserted into the aerosol generating device 1, and the second portion may be exposed outside. Alternatively, only the first portion may be partially inserted into the aerosol generating device 1, or the first portion may be entirely into the aerosol generating device 1 and the second portion may be partially inserted into the aerosol generating device 1. The user may inhale the aerosol with the second portion in a mouth of the user. In this case, the aerosol may be generated as external air passes through the first portion, and the generated aerosol may pass through the second portion into the mouth of the user.

For example, the external air may be introduced through at least one air path formed in the aerosol generating device 1. In this example, opening or closing and/or the size of the air path formed in the aerosol generating device 1 may be adjusted by the user. Accordingly, an amount of atomization, a sense of smoking, or the like may be adjusted by the user. In another example, the external air may be introduced into the inside of the cigarette 2 through at least one hole formed on a surface of the cigarette 2.

Figure 3:
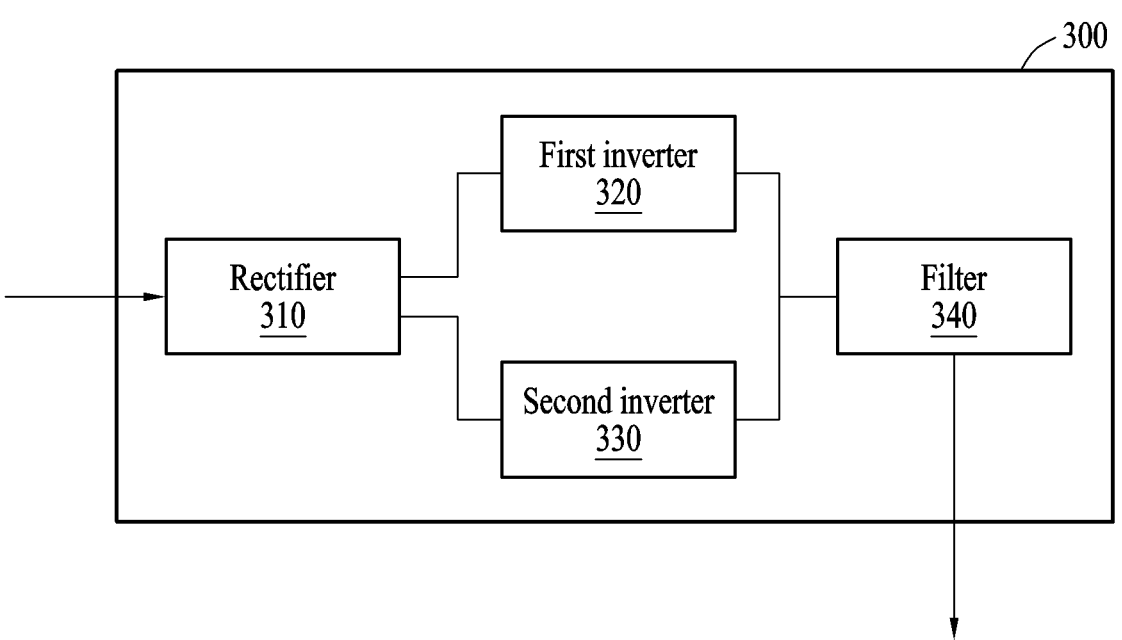
FIG. 3 is a diagram illustrating a configuration of an inverter unit according to an embodiment.

FIG. 3 is a diagram illustrating a configuration of an inverter unit according to an embodiment.

According to an embodiment, an inverter unit 300 (e.g., the inverter 14 of FIGS. 1 and 2) may include a rectifier 310, a first inverter 320, a second inverter 330, and a filter 340.

The rectifier 310 may adjust a magnitude of an output of a DC supplied to the inverter unit 300. For example, the rectifier 310 may be supplied with the DC from the battery 11 of the aerosol generating device 1.

According to an embodiment, the first inverter 320 may generate a first AC having a first frequency based on the DC. For example, the first frequency may be a medium frequency (MF). The second inverter 330 may generate a second AC having a second frequency based on the DC. For example, the second frequency may be a high frequency (HF). The first inverter 320 and the second inverter 330 may be formed as half-bridge inverters.

The filter 340 may generate a synthesized AC by synthesizing the first AC and the second AC. For example, the filter 340 may synthesize the first AC and the second AC through a dual filter. The synthesized AC may have an SDF waveform.

When the synthesized AC is applied to a coil (e.g., the coil of heater 14 of FIGS. 1 and 2), an eddy current may be formed in an object (e.g., a susceptor of an aerosol generating substrate) disposed inside the coil. The synthesized AC may include a first component corresponding to the first frequency and a second component corresponding to the second frequency. A first susceptor and a second susceptor may be heated by the first component and the second component, respectively, simultaneously or with a time difference.

Figure 4:
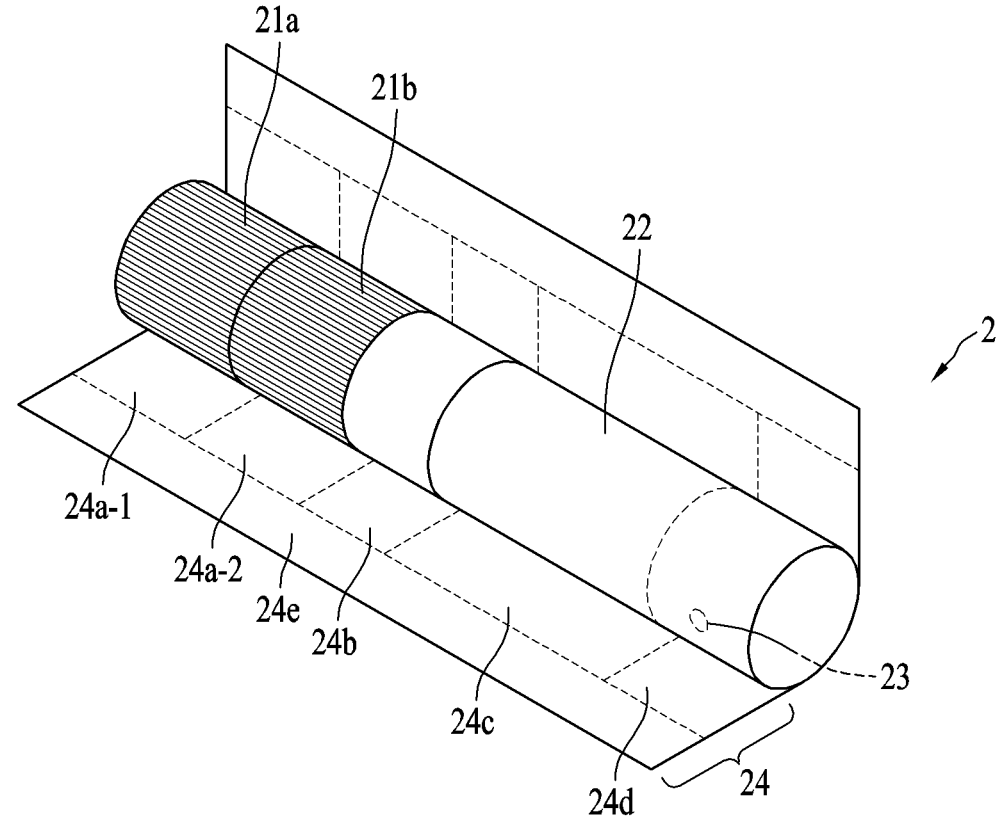
FIGS. 4 and 5 are diagrams illustrating examples of a cigarette according to various embodiments.
Figure 5:
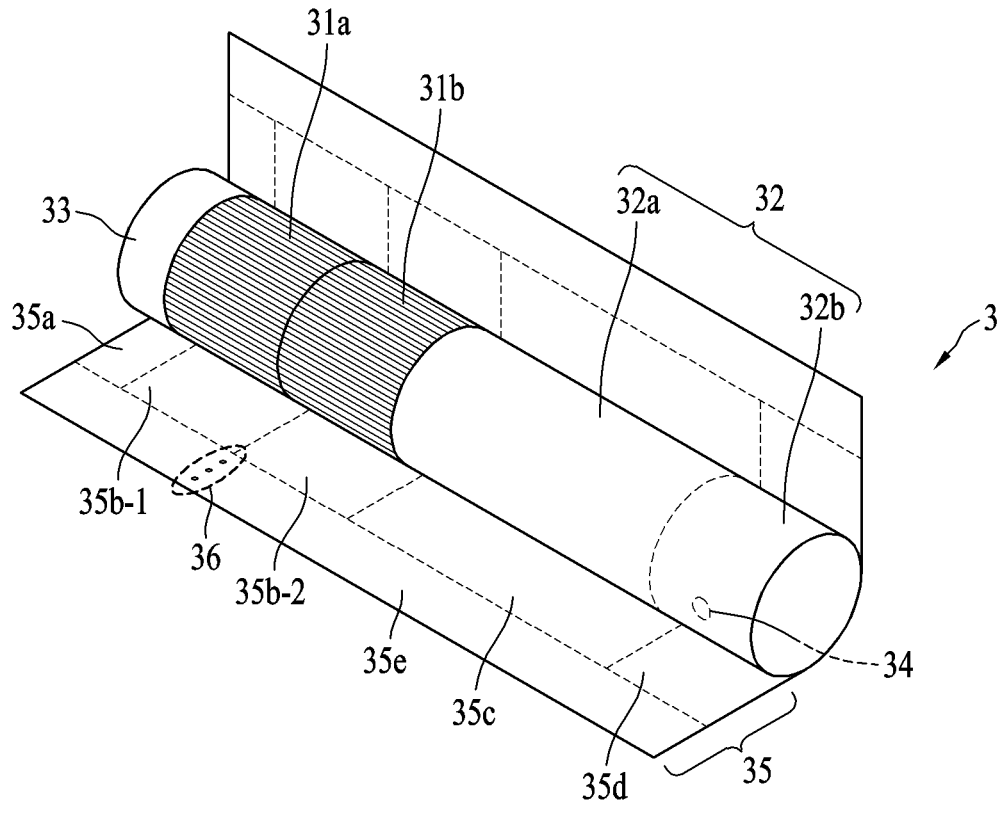

FIGS. 4 and 5 are diagrams illustrating examples of a cigarette according to various embodiments.

Referring to FIG. 4, the cigarette 2 may include a tobacco rod 21 and a filter rod 22. The tobacco rod 21 may include an aerosol generating material, and the filter rod 22 may include a filter or the like.

Although the filter rod 22 is illustrated as having a single segment in FIG. 4, embodiments are not limited thereto. That is, the filter rod 22 may include a plurality of segments. For example, the filter rod 22 may include a segment that cools an aerosol and a segment that filters a predetermined ingredient contained in an aerosol. In addition, the filter rod 22 may further include at least one segment that performs another function, as needed.

According to an embodiment, the tobacco rod 21 may include a first portion 21a and a second portion 21b.

The cigarette 2 may be wrapped with at least one wrapper 24. The wrapper 24 may have at least one hole through which external air is introduced or internal gas flows out. In an example, the cigarette 2 may be wrapped with one wrapper 24. In another example, the cigarette 2 may be wrapped with two or more wrappers 24 in an overlapping manner. For example, the first portion 21a of the tobacco rod 21 may be wrapped by a (1-1)-th wrapper 24a-1, the second portion 21b of the tobacco rod 21 may be wrapped with a (1-2)-th wrapper 24a-1, and the filter rod 22 may be wrapped with wrappers 21b, 24c, and 24d. In addition, the cigarette 2 may be entirely wrapped again with a single wrapper 24e. For example, when the filter rod 22 includes a plurality of segments, the segments may be wrapped with the wrappers 24b, 24c, and 24d, respectively.

For example, the (1-1)-th wrapper 24a-1, the (1-2)-th wrapper 24a-2, and the second wrapper 24b may be formed of general filter wrapping paper. In another example, the (1-1)-th wrapper 24a-1, the (1-2)-th wrapper 24a-2, and the second wrapper 24b may be porous wrapping paper or non-porous wrapping paper. In another example, the (1-1)-th wrapper 24a-1, the (1-2)-th wrapper 24a-2, and the second wrapper 24b may be formed of oilproof paper and/or aluminum laminated wrapping material. In still another example, the (1-1)-th wrapper 24a-1, the (1-2)-th wrapper 24a-2, and the second wrapper 24b may be formed of different materials, respectively.

The third wrapper 24c may be formed of hard wrapping paper.

The fourth wrapper 24d may be formed of oilproof hard wrapping paper.

The fifth wrapper 24e may be formed of sterile paper (e.g., MFW). Here, the sterilized paper (MFW) may refer to paper specially prepared to enhance tensile strength, water resistance, smoothness, or the like, compared to general paper.

The fifth wrapper 24e may have a predetermined material internally added thereto. The predetermined material may be, for example, silicon. However, embodiments are not limited thereto. Silicon may have properties, such as, for example, heat resistance with less change by temperature, oxidation resistance, resistance to various chemicals, water repellency against water, or electrical insulation. However, silicon may not be necessarily used, but any material having such properties described above may be applied (or coated) to the fifth wrapper 24e without limitation.

The fifth wrapper 24e may prevent the cigarette 2 from burning. For example, there may be a probability that the cigarette 2 burns when the tobacco rod 21 is heated by the heater 14. For example, when the temperature rises above an ignition point of any one of materials included in the tobacco rod 21, the cigarette 2 may burn. Even in this case, it may still be possible to prevent the cigarette 2 from burning because the fifth wrapper 24e includes a non-combustible material.

In addition, the fifth wrapper 24e may prevent a holder from being contaminated by substances produced in the cigarette 2. For example, liquid substances may be produced in the cigarette 2 by puffs from the user. For example, as an aerosol generated in the cigarette 2 is cooled by external air, such liquid substances (e.g., water, etc.) may be produced. Thus, wrapping the cigarette 2 with the fifth wrapper 24e may prevent the liquid substances produced in the cigarette 2 from leaking out of the cigarette 2.

The tobacco rod 21 may include an aerosol generating material. The aerosol generating material may include, for example, at least one of glycerin, propylene glycol, ethylene glycol, dipropylene glycol, diethylene glycol, triethylene glycol, tetraethylene glycol, or oleyl alcohol. However, embodiments are not limited thereto. The tobacco rod 21 may also include other additives, for example, a flavoring agent, a wetting agent, and/or an organic acid. In addition, the tobacco rod 21 may include a flavoring liquid such as menthol or a moisturizer that is added as being sprayed onto the tobacco rod 21.

The tobacco rod 21 may be manufactured in various forms. For example, the tobacco rod 21 may be manufactured as a sheet or as a strand. The tobacco rod 21 may also be formed with a cut tobacco filler from finely cut tobacco sheets. In addition, the tobacco rod 21 may be enveloped by a thermally conductive material. The thermally conductive material may be, for example, a metal foil such as an aluminum foil, but is not limited thereto. For example, the thermally conductive material enveloping the tobacco rod 21 may evenly distribute the heat transferred to the tobacco rod 21 to improve the conductivity of the heat to be applied to the tobacco rod 21, thereby improving the taste of tobacco. In addition, the thermally conductive material enveloping the tobacco rod 21 may function as a susceptor heated by the coil of the heater 14. Here, although not shown in the drawings, the tobacco rod 21 may further include an additional susceptor in addition to the thermally conductive material enveloping the outside thereof.

According to an embodiment, the tobacco rod 21 may include the first portion 21a and the second portion 21b, and the (1-1)-th wrapper 24a-1 and the (1-2)-th wrapper 24a-2 respectively wrapping the first portion 21a and the second portion 21b may be formed of different materials. For example, the first portion 21a may include a liquid, and the second portion 21b may include a medium. When the synthesized AC flows through the coil, the (1-1)-th wrapper 24a-1 and the (1-2)-th wrapper 24a-2 may function as different susceptors, respectively. The susceptor of the (1-1) wrapper 24a-1 may react to the first component of the synthesized AC, and the susceptor of the (1-2)-th wrapper 24a-2 may react to the second component of the synthesized AC. A heating temperature of the first portion 21a and a heating temperature of the second portion 21b may be separately controlled by controlling at least one of the first component or the second component of the synthesized AC. For example, the directionality of a temperature rise and a temperature decrease for each of the first portion 21a and the second portion 21b may be separated from each other by controlling the first component and the second component of the synthesized AC.

According to the embodiment described above, when different susceptors are applied to the same medium (e.g., reconstituted tobacco or cut tobacco), the user may be provided with nicotine and glycerin uniformly as an aerosol by a temperature control method of first increasing a temperature of an upper portion close to a mouth portion, and increasing a temperature of a lower portion later.

According to the embodiment described above, when different susceptors are applied to different substances (e.g., a liquid and medium), the user may be provided with nicotine and glycerin uniformly as an aerosol by a temperature control method of promoting initial atomization by first increasing a temperature of a liquid in a lower portion, and increasing a temperature of a medium in the upper portion later.

The filter rod 22 may be a cellulose acetate filter. However, a shape of the filter rod 22 is not limited. For example, the filter rod 22 may be a cylindrical rod, or a tubular rod including a hollow therein. The filter rod 22 may also be a recess-type rod. For example, when the filter rod 22 includes a plurality of segments, at least one of the segments may be manufactured in a different shape.

A first segment of the filter rod 22 may be a cellulose acetate filter. For example, the first segment may be a tubular structure including a hollow therein. The first segment may prevent internal materials of the tobacco rod 21 from being pushed back when the heater 14 is inserted and generate an aerosol cooling effect.

The first segment may have a hardness that may be adjusted by adjusting content of a plasticizer in a process of manufacturing the first segment. In addition, the first segment may be manufactured by inserting a structure such as a film or a tube of the same or different materials therein (e.g., in the hollow).

A second segment of the filter rod 22 may cool an aerosol generated as the heater 14 heats the tobacco rod 21. The user may thus inhale the aerosol cooled down to a suitable temperature. A length or diameter of the second segment may be determined in various ways according to the shape of the cigarette 2.

The second segment may be manufactured by weaving a polymer fiber. In this case, a flavoring liquid may be applied to a fiber formed of a polymer. Alternatively, the second segment may be manufactured by weaving a separate fiber to which a flavoring liquid is applied and the fiber formed of the polymer together. Alternatively, the second segment may be formed with a crimped polymer sheet.

For example, the polymer may be prepared with a material selected from the group consisting of polyethylene (PE), polypropylene (PP), polyvinyl chloride (PVC), polyethylene terephthalate (PET), polylactic acid (PLA), cellulose acetate (CA,) and aluminum foil.

As the second segment is formed with the woven polymer fiber or the crimped polymer sheet, the second segment may include a single channel or a plurality of channels extending in a longitudinal direction. A channel used herein may refer to a path through which a gas (e.g., air or aerosol) passes.

Meanwhile, the second segment may include a thread containing a volatile flavor ingredient. The volatile flavor ingredient may be menthol, but is not limited thereto. For example, the thread may be filled with a sufficient amount of menthol to provide at least 1.5 milligrams (mg) of menthol to the second segment.

A third segment of the filter rod 22 may be a cellulose acetate filter. The third segment may be manufactured such that a flavor is generated by spraying a flavoring liquid onto the third segment in the process of manufacturing the third segment. Alternatively, a separate fiber to which the flavoring liquid is applied may be inserted into the third segment. An aerosol generated in the tobacco rod 21 may be cooled as it passes through the second segment of the filter rod 22, and the cooled aerosol may pass through the third segment into the user. Accordingly, when a flavoring element is added to the third segment, the flavor carried to the user may last much longer.

In addition, the filter rod 22 may include at least one capsule 23. The capsule 23 may perform a function of generating a flavor or a function of generating an aerosol. For example, the capsule 23 may have a structure in which a liquid containing a fragrance is wrapped with a film. The capsule 23 may have a spherical or cylindrical shape. However, embodiments are not limited thereto.

Referring to FIG. 5, a cigarette 3 may further include a front end plug 33, unlike the cigarette 2. The front end plug 33 may be disposed on one side of a tobacco rod 31 facing a filter rod 32. The front end plug 33 may prevent the tobacco rod 31 from escaping to the outside, and may also prevent an aerosol liquefied from the tobacco rod 31 during smoking from flowing into an aerosol generating device (e.g., the aerosol generating device 1 of FIGS. 1 and 2).

The filter rod 32 may include a first segment 32a and a second segment 32b. The first segment 32a may correspond to the first segment of the filter rod 22 of FIG. 4, and the second segment 32b may correspond to the third segment of the filter rod 22 of FIG. 4.

The cigarette 3 may be wrapped with at least one wrapper 35. The wrapper 35 may have at least one hole through which external air is introduced or internal gas flows out. For example, the front end plug 33 may be wrapped with a first wrapper 35a, the tobacco rod 31 may be wrapped with second wrappers 35b-1 and 35b-2, the first segment 32a may be wrapped with a third wrapper 35c, and the second segment 32b may be wrapped with a fourth wrapper 35d. In addition, the cigarette 3 may be entirely wrapped again with a fifth wrapper 35e.

In addition, at least one perforation 36 may be formed on the fifth wrapper 35e. For example, the perforation 36 may be formed in an area surrounding the tobacco rod 31. However, embodiments are not limited thereto. The perforation 36 may perform a function of transferring heat generated by the heater 14 shown in FIGS. 1 and 2 to the inside of the tobacco rod 31.

In addition, the second segment 32b may include at least one capsule 34. The capsule 34 may perform a function of generating a flavor or a function of generating an aerosol. For example, the capsule 34 may have a structure in which a liquid containing a fragrance is wrapped with a film. The capsule 34 may have a spherical or cylindrical shape. However, embodiments are not limited thereto.

The first wrapper 35a may be a combination of general filter wrapping paper and a metal foil such as an aluminum foil.

For example, the (2-1)-th wrapper 35b-1, the (2-2)-th wrapper 35b-2, the third wrapper 35c may be formed of general filter wrapping paper. In another example, the (2-1)-th wrapper 35b-1, the (2-2)-th wrapper 35b-2, and the third wrapper 35c may be porous wrapping paper or non-porous wrapping paper. In another example, the (2-1)-th wrapper 35b-1, the (2-2)-th wrapper 35b-2, and the third wrapper 35c may be formed of oilproof paper and/or aluminum laminated wrapping material. In still another example, the (2-1)-th wrapper 35b-1, the (2-2)-th wrapper 35b-2, and the third wrapper 35c may be formed of different materials, respectively.

The fourth wrapper 35d may be formed with polylactic acid (PLA) laminated paper. The PLA laminated paper may refer to three-ply paper including a paper layer, a PLA layer, and a paper layer.

The fifth wrapper 35e may be formed of sterile paper (e.g., MFW). Here, the sterilized paper (MFW) may refer to paper specially prepared to enhance tensile strength, water resistance, smoothness, or the like, compared to general paper.

The fifth wrapper 35e may have a predetermined material internally added thereto. The predetermined material may be, for example, silicon. However, embodiments are not limited thereto. Silicon may have properties, such as, for example, heat resistance with less change by temperature, oxidation resistance, resistance to various chemicals, water repellency against water, or electrical insulation. However, silicon may not be necessarily used, but any material having such properties described above may be applied (or coated) to the fifth wrapper 35e without limitation.

The front end plug 33 may be formed of cellulose acetate. For example, the front end plug 33 may be manufactured by adding a plasticizer (e.g., triacetin) to cellulose acetate tow. A mono denier of a filament of the cellulose acetate tow may be in a range of 1.0 to 10.0, and may be desirably in a range of 4.0 to 6.0. The mono denier of the filament of the front end plug 33 may be more desirably 5.0. In addition, a cross section of the filament of the front end plug 33 may be Y-shaped. A total denier of the front end plug 33 may be in a range of 20000 to 30000, and may be desirably in a range of 25000 to 30000. The total denier of the front end plug 33 may be more desirably 28000.

In addition, as needed, the front end plug 33 may include at least one channel, and a cross-sectional shape of the channel may be provided in various ways.

The tobacco rod 31 may correspond to the tobacco rod 21 described above with reference to FIG. 4. Thus, a detailed description of the tobacco rod 31 will be omitted here.

The first segment 32a may be formed of cellulose acetate. For example, the first segment may be a tubular structure including a hollow therein. The first segment 32a may be manufactured by adding a plasticizer (e.g., triacetin) to cellulose acetate tow. For example, a mono denier and a total denier of the first segment 32a may be the same as the mono denier and the total denier of the front end plug 33.

The second segment 32b may be formed of cellulose acetate. A mono denier of a filament of the second segment 32b may be in a range of 1.0 to 10.0, and may be desirably in a range of 8.0 to 10.0. The mono denier of the filament of the second segment 32b may be more desirably 9.0. In addition, a cross section of the filament of the second segment 32b may be Y-shaped. A total denier of the second segment 32b may be in a range of 20000 to 30000, and may be desirably 25000.

Figure 6:
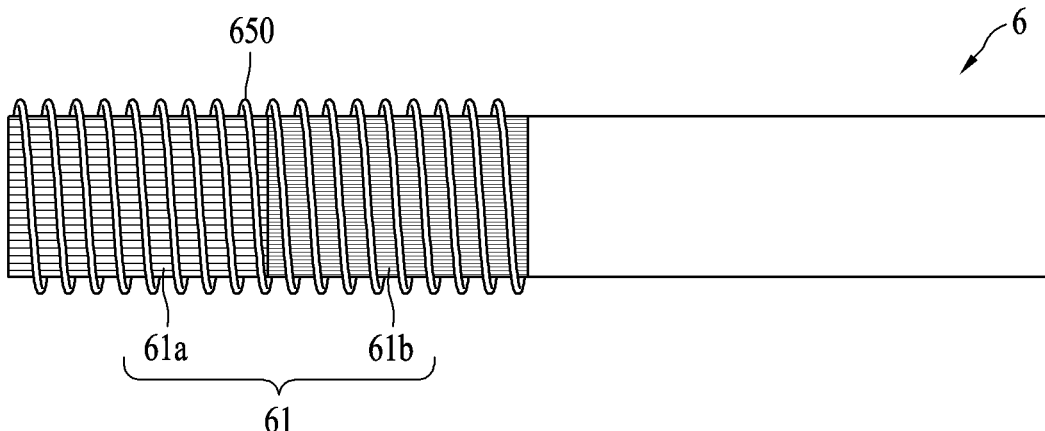
FIG. 6 is a diagram illustrating a positional relationship between a coil of a heater and a cigarette according to an embodiment.

FIG. 6 is a diagram illustrating a positional relationship between a coil of a heater and a cigarette according to an embodiment.

According to an embodiment, a cigarette 6 (e.g., the cigarette 2 of FIG. 4 or the cigarette 3 of FIG. 5) may be inserted into the aerosol generating device 1. For example, the cigarette 6 may be inserted into the aerosol generating device 1 such that a tobacco rod 61 (e.g., the tobacco rod 21 of FIG. 4 or the tobacco rod 31 of FIG. 5) of the cigarette 6 is disposed inside a coil 650 of the heater 14 of the aerosol generating device 1. According to an embodiment, the coil 650 has a spiral shape in the drawing, but there is no limitation as long as the shape of the coil 650 may be wound around the tobacco rod 61.

According to an embodiment, the tobacco rod 61 may include a first portion 61a (e.g., the first portion 21a of FIG. 4 or the first portion 31a of FIG. 5) and a second portion 61b (e.g., the second portion 21b of FIG. 4 or the second portion 31b of FIG. 5). For example, the wrappers wrapping the first portion 61a and the second portion 61b may be formed of different materials, respectively.

When the synthesized AC flows through the coil 650, the wrappers of the first portion 61a and the second portion 61b may function as different susceptors, respectively. The susceptor of the wrapper of the first portion 61a may react to the first component of the synthesized AC, and the susceptor of the wrapper of the second portion 61b may react to the second component of the synthesized AC. A heating temperature of the first portion 61a and a heating temperature of the second portion 61b may be separately controlled by controlling at least one of the first component or the second component of the synthesized AC. For example, the directionality of a temperature rise and a temperature decrease for each of the first portion 61a and the second portion 61b may be separated from each other by controlling the first component and the second component of the synthesized AC.

Figure 7:
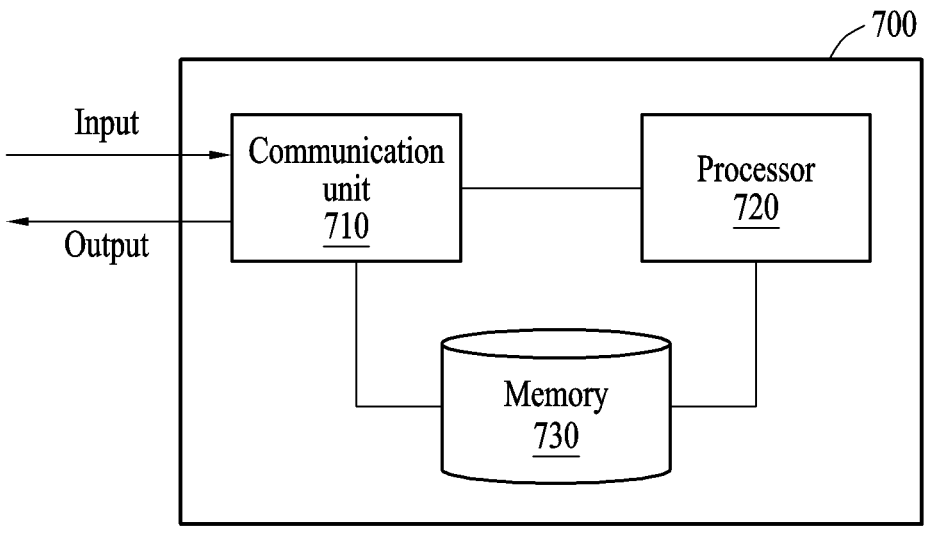
FIG. 7 is a diagram illustrating a configuration of a controller according to an embodiment.

FIG. 7 is a diagram illustrating a configuration of a controller according to an embodiment.

According to an embodiment, a controller 700 (e.g., the controller 12 of FIGS. 1 and 2) may include a communication unit 710, a processor 720, and a memory 730.

The communication unit 710 may be connected to the processor 720 and the memory 730 to transmit and receive data to and from the processor 720 and the memory 730. The communication unit 710 may be connected to another external device and may transmit and receive data to and from the external device. Hereinafter, the expression "transmitting and receiving A" may be construed as transmitting and receiving "information or data indicating A."

The communication unit 710 may be implemented as circuitry in the controller 700. For example, the communication unit 710 may include an internal bus and an external bus. In another example, the communication unit 710 may be an element that connects the controller 700 and the external device. The communication unit 710 may be an interface. The communication unit 710 may receive data from the external device and transmit the data to the processor 720 and the memory 730.

The processor 720 may process the data received by the communication unit 710 and data stored in the memory 730. A "processor" may be a hardware-implemented data processing device having a physically structured circuit to execute desired operations. The desired operations may include, for example, codes or instructions included in a program. The hardware-implemented data processing device may include, for example, a microprocessor, a central processing unit (CPU), a processor core, a multi-core processor, a multiprocessor, an application-specific integrated circuit (ASIC), and a field-programmable gate array (FPGA).

The processor 720 may execute computer-readable code (e.g., software) stored in a memory (e.g., the memory 730) and instructions triggered by the processor 720.

The memory 730 may store the data received by the communication unit 710 and the data processed by the processor 720. For example, the memory 730 may store the program (or an application, or software). The program to be stored may be a set of syntaxes that are coded and executable by the processor 720 to control the aerosol generating device (e.g., the aerosol generating device 1 of FIGS. 1 and 2).

According to an aspect, the memory 730 may include, for example, at least one volatile memory, nonvolatile memory, random-access memory (RAM), flash memory, a hard disk drive, and an optical disc drive.

The memory 730 may store an instruction set (e.g., software) for operating the controller 700. The instruction set for operating the controller 700 may be executed by the processor 720.

The communication unit 710, the processor 720, and the memory 730 will be described in detail below with reference to FIG. 8.

Figure 8:
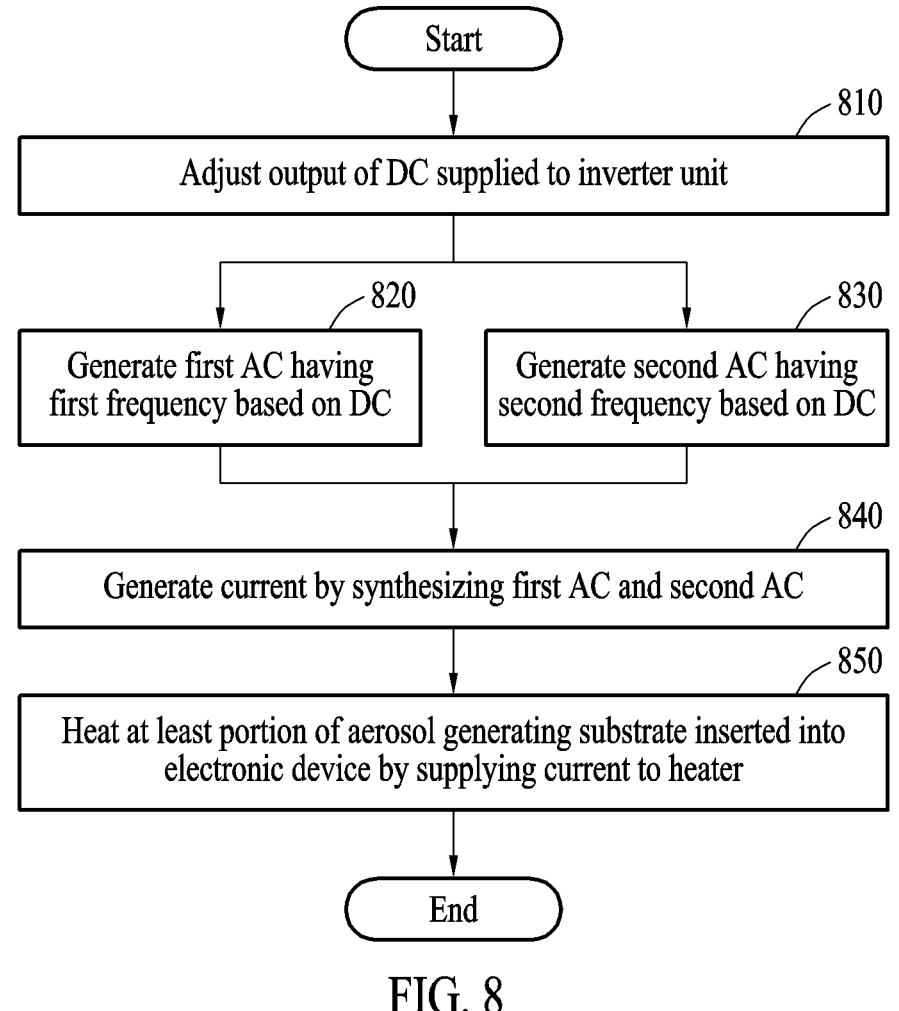
FIG. 8 is a flowchart illustrating a method of supplying a current to a heater according to an embodiment.

FIG. 8 is a flowchart illustrating a method of supplying a current to a heater according to an embodiment.

Operations 810 to 850 may be performed by an electronic device (e.g., the aerosol generating device 1 of FIG. 1).

In operation 810, the electronic device may adjust an output of a current supplied to an inverter unit (e.g., the inverter unit 13 of FIG. 1). For example, a rectifier of the inverter unit of the electronic device may adjust the output of power or a DC supplied from a battery (e.g., the battery 11 of FIG. 1).

In operation 820, a first inverter of the inverter unit of the electronic device may generate a first AC having a first frequency based on the DC. For example, the first frequency may be a frequency within a medium frequency (MF) band. For example, the MF band may include 300 kilohertz (KHz) to 3000 KHz.

In operation 830, a second inverter of the inverter unit of the electronic device may generate a second AC having a second frequency based on the DC. For example, the second frequency may be a frequency within a high frequency (HF) band. For example, the HF band may include 3 megahertz (MHz) to 30 MHz.

According to an embodiment, the first inverter and the second inverter may be formed as half-bridge inverters, but a circuit structure within the inverter unit is not limited to the embodiments described above.

In operation 840, a filter of the inverter unit of the electronic device may generate a synthesized AC by synthesizing the first AC and the second AC. The synthesized AC may have an SDF.

According to an embodiment, the filter may be a dual-band filter.

In operation 850, the electronic device may heat at least a portion of an aerosol generating substrate inserted into the electronic device by supplying the synthesized AC to a heater (e.g., the heater 14 of FIGS. 1 and 2). For example, the aerosol generating substrate may correspond to the tobacco rod 21 of FIG. 4 or the tobacco rod 31 of FIG. 5.

According to an embodiment, the aerosol generating substrate may include a first portion (e.g., the first portion 21*a* of FIG. 4 or the first portion 31*a* of FIG. 5) and a second portion (e.g., the second portion 21*b* of FIG. 4 or the second portion 31*b* of FIG. 5) which are formed of different materials. For example, the first portion may include a liquid, and the second portion may include a medium.

The first portion may be wrapped with a first wrapper including a first susceptor, and the second portion may be wrapped with a second wrapper including a second susceptor. The first susceptor and the second susceptor may be different materials or may have different properties with respect to induction heating. The first susceptor of the first wrapper may react to a first component of the synthesized AC, and the second susceptor of the second wrapper may react to a second component of the synthesized AC. A heating temperature of the first portion and a heating temperature of the second portion may be separately controlled by controlling at least one of the first component or the second component of the synthesized AC. For example, the directionality of a temperature rise and a temperature decrease for each of the first portion and the second portion may be separated from each other by controlling the first component and the second component of the synthesized AC.

According to the embodiment described above, when different susceptors are applied to different substances (e.g., a liquid and medium), the user may be provided with nicotine and glycerin uniformly as an aerosol by a temperature control method of promoting initial atomization by first increasing a temperature of a liquid in a lower portion, and increasing a temperature of a medium in the upper portion later.

According to an embodiment, the aerosol generating substrate may include a first portion (e.g., the first portion 21*a* of FIG. 4 or the first portion 31*a* of FIG. 5) and a second portion (e.g., the second portion 21*b* of FIG. 4 or the second portion 31*b* of FIG. 5) which are formed of the same material (e.g., a medium).

The first portion may be wrapped with a first wrapper including a first susceptor, and the second portion may be wrapped with a second wrapper including a second susceptor. The first susceptor and the second susceptor may be different materials or may have different properties with respect to induction heating.

According to the embodiment described above, when different susceptors are applied to the same medium, the user may be provided with nicotine and glycerin uniformly as an aerosol by a temperature control method of first increasing a temperature of an upper portion close to a mouth portion, and increasing a temperature of a lower portion later.

According to an embodiment, a controller of the electronic device may determine a current smoking state of a user (e.g., the start of smoking, inhalation, exhalation, the number of puffs, the end of smoking, etc.) based on information obtained from a sensing unit (e.g., the sensor unit 10 of FIGS. 1 and 2), and adjust at least one of the output of the DC, the first frequency, or the second frequency based on the determined current smoking state. For example, at least one of the output of the DC, the first frequency, or the second frequency may be adjusted based on temperature profiles for each of the first portion and the second portion of the aerosol generating substrate corresponding to various smoking states.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random-access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The devices described above may be configured to act as one or more software modules in order to perform the operations of the example embodiments, or vice versa.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software may also be distributed over network coupled computer systems so that the software is stored and executed in a distributed fashion. The software and data may be stored by one or more non-transitory computer readable recording mediums.

While the example embodiments are described with reference to drawings, it will be apparent to one of ordinary skill in the art that various alterations and modifications in form and details may be made in these example embodiments without departing from the spirit and scope of the claims and their equivalents. For example, suitable results May be achieved if the described techniques are performed in a different order, and/or if components in a described system, architecture, device, or circuit are combined in a different manner, and/or replaced or supplemented by other components or their equivalents.

Accordingly, other implementations are within the scope of the following claims.

The invention claimed is:

1. An electronic device comprising:
a controller configured to control an operation of the electronic device;
an inverter unit configured to supply a current to a heater; and
the heater configured to heat at least a portion of an aerosol generating substrate inserted into the electronic device using the current,
wherein the current has a simultaneous dual-frequency (SDF), and
wherein the inverter unit comprises:
a rectifier configured to adjust an output of a direct current (DC) to be supplied to a first inverter, wherein the first inverter is configured to generate a first alternating current (AC) having a first frequency based on the DC;
a second inverter configured to generate a second AC having a second frequency based on the DC; and
a filter configured to generate the current by synthesizing the first AC and the second AC.

2. The electronic device of claim 1,
wherein an eddy current is generated in the at least a portion of the aerosol generating substrate by the current, and
wherein the aerosol generating substrate is heated by the eddy current.

3. The electronic device of claim 2,
wherein a first portion of the aerosol generating substrate is heated by a first component of the current corresponding to the first AC, and
wherein a second portion of the aerosol generating substrate is heated by a second component of the current corresponding to the second AC.

4. The electronic device of claim 1,
wherein the first AC has a medium frequency (MF), and
wherein the second AC has a high frequency (HF).

5. The electronic device of claim 1, wherein the heater comprises a coil formed to be wound around the aerosol generating substrate.

6. A method of controlling an electronic device, the method comprising:
adjusting an output of a direct current (DC) supplied to an inverter unit of the electronic device;
generating a first alternating current (AC) having a first frequency based on the DC;
generating a second AC having a second frequency based on the DC;
generating a current by synthesizing the first AC and the second AC; and
heating at least a portion of an aerosol generating substrate inserted into the electronic device by supplying the current to a heater of the electronic device,
wherein the current has a simultaneous dual-frequency (SDF).

7. The method of claim 6,
wherein an eddy current is generated in the at least a portion of the aerosol generating substrate by the current, and
wherein the aerosol generating substrate is heated by the eddy current.

8. The method of claim 7,
wherein a first portion of the aerosol generating substrate is heated by a first component of the current corresponding to the first AC, and
wherein a second portion of the aerosol generating substrate is heated by a second component of the current corresponding to the second AC.

9. The method of claim 8, wherein the heater comprises a coil formed to be wound around the aerosol generating substrate.

10. A non-transitory computer-readable storage medium storing instructions that are executable by a processor to perform the method of claim 6.

* * * * *